P. BARNES.
TRUCK FOR MONORAILWAY CARS.
APPLICATION FILED OCT. 2, 1911.
1,043,793.
Patented Nov. 12, 1912.
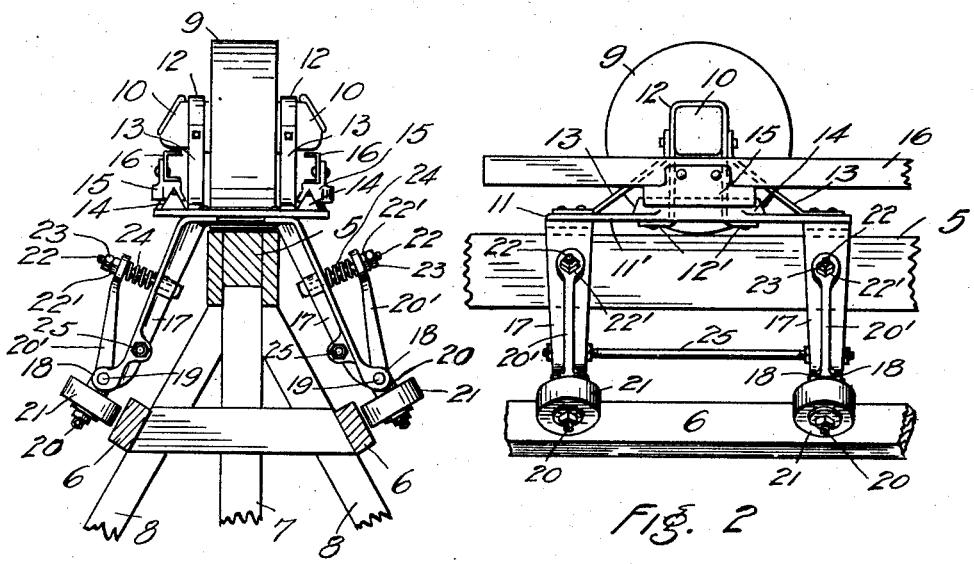
Fig. 1
Fig. 2
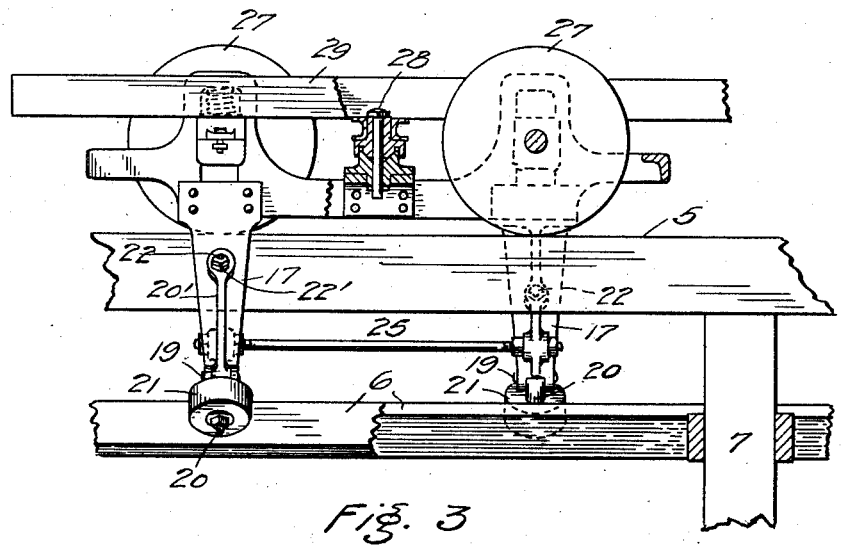
Fig. 3
WITNESSES:
F. C. Matheny
Horace Barnes
INVENTOR
Pierre Barnes

UNITED STATES PATENT OFFICE.

PIERRE BARNES, OF SEATTLE, WASHINGTON, ASSIGNOR TO INTERNATIONAL MONORAIL CO., OF SEATTLE, WASHINGTON, A CORPORATION OF WASHINGTON.

TRUCK FOR MONORAILWAY-CARS.

1,043,793.

Specification of Letters Patent.

Patented Nov. 12, 1912.

Application filed October 2, 1911. Serial No. 652,282.

*To all whom it may concern:*

Be it known that I, PIERRE BARNES, a citizen of the United States, residing at Seattle, in the county of King and State of Washington, have invented certain new and useful Improvements in Trucks for Monorailway-Cars, of which the following is a specification.

This invention relates to cars operating on a single-rail elevated track having stringers, or guide rails, disposed at opposite sides of the track structure and below the level of the track-rail.

The object of my invention is the improvement of trucks to render them more serviceable for this type of track by relieving the track and rolling stock of excessive friction and strains.

The invention consists in the novel construction, and combination of devices as will be hereinafter described and claimed.

In the accompanying drawings, Figure 1 is an end view of a monorail track and a truck embodying my improvements mounted thereon. Fig. 2 is a side elevation of the same. Fig. 3 is a view, partly in side elevation and partly in vertical section, showing a modified construction of truck.

Referring to the drawings, 5 indicates a track rail and 6 the guide rails of a track structure which may be supported by posts 7 and braces 8 such as illustrated in Figs. 1 and 3.

The car-truck shown in Figs. 1 and 2 is provided with a single traction wheel 9 having an axle journaled in boxes 10. Said boxes are connected to a depending truck frame 11 by means of bars 12 and 13, whereof the former, 12, are provided with hooked lower ends 12' which engage below and fixedly secured to the side members 11' of the truck frame, and the others, 13, are arranged to serve as braces by securing them adjacent to the ends of the frame as represented in Fig. 2. Projecting upwardly from the truck members 11' and disposed concentrically to a vertical line extending diametrically through the center of the wheel 8 are arcuate shaped ridges 14 interfitting with superposed companion plates 15 secured to the underside of a frame 16. This frame may be the underframe, so called, of a car or it may be an auxiliary frame from which the body of a car is suspended.

Adjacent to the ends of the truck frame and rigidly connected thereto are hangers 17 extending downwardly into proximity to the guide rails 6 at each side of the track. At their lower extremities said hangers are provided with lugs 18 which are apertured to each receive a pin serving as a fulcrum for a substantially upright lever. The lower arms 20 of these levers are machined to furnish axle-bearings for guide wheels 21. The upper arm 20' of each lever is relatively long and is apertured to receive a bolt 22 engaged with and extending outwardly from the adjacent hanger 17. Said bolt is screw-threaded to receive a nut 22' near its end whereby the outward swinging movement of a lever arm 20' is limited for the purpose of maintaining the respective guide wheel 21 at a predetermined distance — say, three eighths of an inch — from the opposing face of a guide rail 6 when the truck is in an upright position and is located or traveling on a straight portion of the track. A lock nut 23 is desirably utilized on a bolt to prevent an adjusting-nut 22' from becoming loose through any vibrations occurring thereto during the travel of a car.

Surrounding a bolt 22 and interposed between a lever arm 20' and a hanger 17 is a helical spring 24 whose office is to allow the associated guide wheel to be pushed out when passing from a straight to a curved portion of the track or to yieldingly react against the lateral tilting of a car truck subsequent to the contacting of the periphery of a wheel 21 with a guide rail.

25 is a tie-rod coupling the hangers at each side of a truck.

In Fig. 3, I show a truck frame provided with two traction wheels 27 and is swiveled about a centrally disposed king-pin 28 to afford a turning movement to the truck with respect to the frame 29 by which the car body is supported.

The hangers 17, the guide wheels 21 and the devices for controlling the latter are similar to those described with respect to the other views and are denoted by corresponding reference numbers.

From the foregoing explanation of the invention, it is evident that the guide-wheels 21 act to swerve a truck to direct the same normal to the track when traveling and are also presented to oppose the lateral tilting of the truck. Furthermore, the levers are designed to afford mechanical advantage to the springs whereby moderately powerful springs are capable to oppose a considerable force tending to overturn a truck and at the same time gradually overcome such effects through the yielding of the springs.

By maintaining the guide wheels under ordinary conditions in spaced relations with the guide rails, through the instrumentality of the nutted bolts, the guide wheels are inoperative except under the aforementioned conditions, resulting in minimizing the friction and rendering the propulsion of a car more easy as well as more free from jars and shocks.

What I claim, is—

1. A truck having at each side a pair of depending hangers, a lever fulcrumed intermediate its length to each of said hangers, a wheel journaled on the lower arm of a lever, a spring interposed between the other arm of the lever and the adjacent hanger, and adjustable means acting in opposition to the spring for limiting the outward movement of the last named arm.

2. A truck having at each side a hanger rigidly connected thereto, a lever carried by each of said hangers, a wheel journaled on one arm of each lever, and a spring acting against the other arm to resist the outward movement of the first named arm.

3. The combination with a track comprising a single track rail and two guide rails subjacent thereto, of a truck having a traction wheel for said track rail, guide wheels carried by the truck at opposite sides and disposed in proximity to said guide rails, adjustable means for limiting the inward movement of said guide wheels toward the guide-rails, and means for yieldingly holding the guide wheels against movement in a contrary direction.

4. The combination with a track rail and two guide rails disposed at opposite sides of the track rail, of a car truck provided with a traction wheel operating on said track rail, hangers rigidly secured to the truck frame and extending into proximity of said guide rails, a lever carried by each of said hangers, guide wheels carried by the respective levers, positive means for controlling said levers to normally maintain the guide wheels at predetermined distances from the adjacent guide rails, and springs for yieldingly opposing the movements of the guide wheels in a contrary direction.

Signed at Seattle, Wash., this 16th day of Sept., 1911.

PIERRE BARNES.

Witnesses:
E. PETERSON,
W. H. SHEPARD.

Copies of this patent may be obtained for five cents each, by addressing the "Commissioner of Patents, Washington, D. C."